Patented June 16, 1936

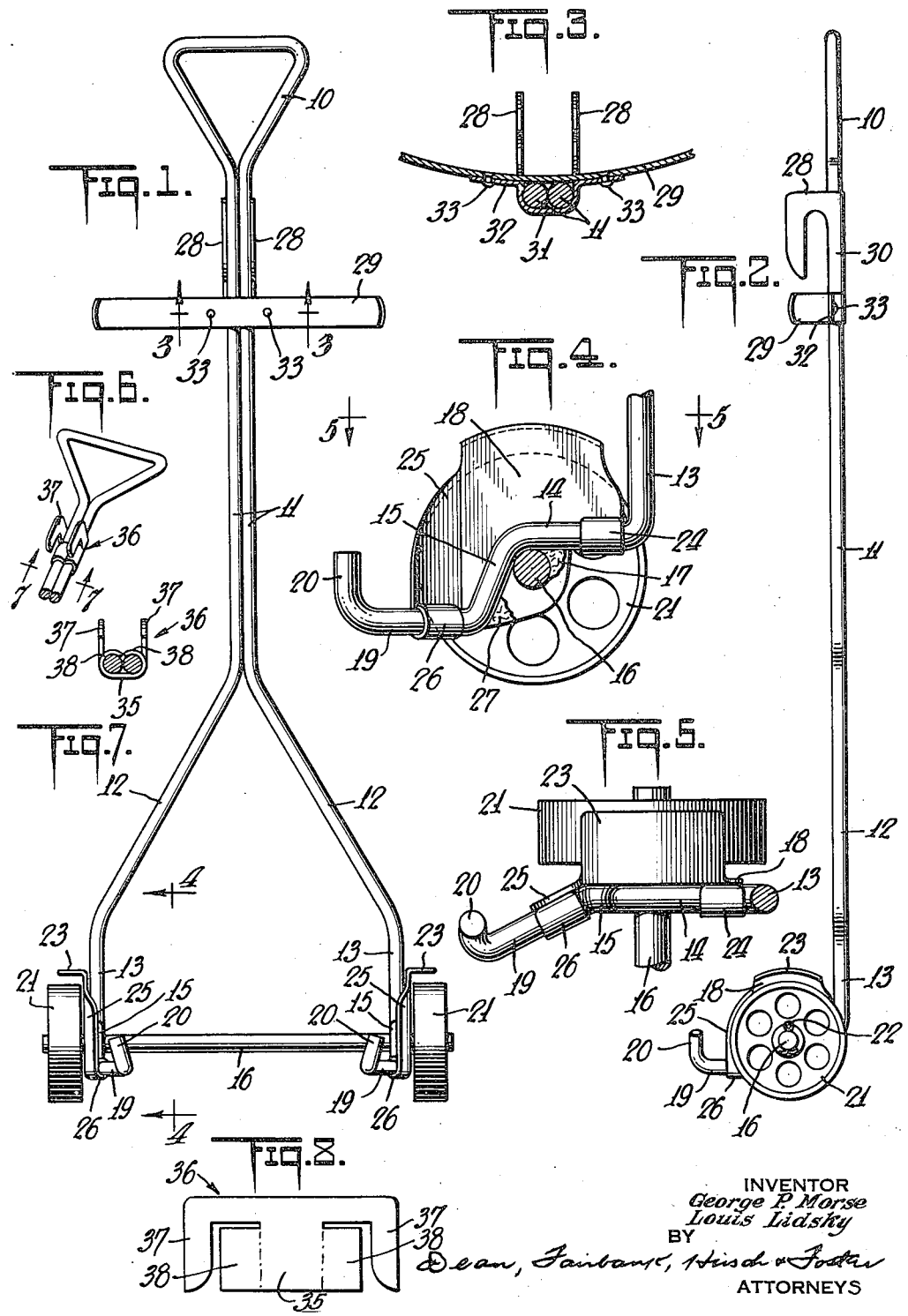

2,044,363

UNITED STATES PATENT OFFICE 2,044,363

HAND TRUCK

George P. Morse and Louis Lidsky,
Brooklyn, N. Y.

Application January 8, 1934, Serial No. 705,696

1 Claim. (Cl. 280—53)

Our present invention relates to improvements in hand trucks and more specifically to improvements in the type of truck shown in the patent to More No. 1,380,073, dated May 31, 1921.

This general type of truck is especially useful for handling ash cans, barrels and similar receptacles and an object of the invention is to improve the type of construction heretofore employed by material simplification of structure, by increased strength, and by effectively guarding the article carried by the truck, from contact with the wheels of the latter.

Other and more general objects are to provide a truck of simple, practical, rugged, inexpensive, durable construction, capable of convenient manipulation with one hand either for trundling a load about on a level surface, pushing or pulling it up inclined surfaces, or drawing a load (typically an ash barrel) or the like up a flight of stairs.

A truck of the general character shown in the above identified patent includes a single piece metal frame formed of heavy bent wire or rod stock to define a yoke connected to the wheel axles, a shank rising from the yoke and a handle at the end of the shank; hook means slidable on the handle are adapted to engage over the upper edge of the barrel and hook means afforded by the forwardly presented lower extremities of the yoke are adapted to engage under the lower edge of the barrel so that the load is securely locked to the truck.

One of the specific structural improvements of the present application is to materially enhance the strength of the sliding article engaging hook means by complete rearrangement of the hook structure and the use of the shank as a reactance piece for the hook.

Another specific improvement is the elimination of special coupling castings and the welding of the unitary frame member directly to the axle.

A further improvement is the use of wheel guards which prevent the article being carried from contacting with any part of the traction wheels, these wheel guards being of simple construction and preferably secured to the main frame piece. They are particularly advantageous in that they prevent an article from working against the inner face of the wheels, thereby exerting a braking action or resting upon the top of the wheels so that it would exert a braking action if the truck were drawn rearwardly or thrust off the truck if the latter were rolled forwardly.

The invention may be more fully understood from the following description in connection with the accompanying drawing wherein:—

Fig. 1 is a front elevational view of the truck embodying the invention,

Fig. 2 is a side elevational view therethrough,

Fig. 3 is an enlarged sectional detail of the sliding hook structure on the line 3—3 of Fig. 1, Fig. 4 is an enlarged view in vertical section through the axle and showing one of the wheel guards and associated parts in inside elevation, this view being taken approximately on the line 4—4 of Fig. 1, Fig. 5 is a sectional plan view on the line 5—5 of Fig. 4, Fig. 6 is a reduced perspective view of the handle with a modified type of slide hook on the shank, Fig. 7 is an enlarged transverse sectional detail on the line 7—7 of Fig. 6, and Fig. 8 is a plan view of the metal blank from which the hook of Figs. 6 and 7 are formed.

The main frame of the truck while bearing a superficial resemblance to the frame of the above identified patent, differs therefrom in important particulars. This frame is preferably bent from a single length of rod or heavy wire stock.

The intermediate portion of the wire or rod is bent to define a triangular handle member 10 and two runs of the stock lying side by side (and welded together if desired) extend downwardly from the handle member and cooperatively constitute the shank 11. Below the shank 11 the two runs of stock diverge as at 12 constituting a yoke, the lower portion of which is formed by parallel runs 13 of the stock, portions 10, 11, 12 and 13, all lying in the same plane as will be apparent from Fig. 2 of the drawing. Beyond the portions 13 (Fig. 4) the ends of the stock are bent forwardly at right angles presenting relatively short horizontal portions 14 and then turned downwardly and forwardly as at 15, the angles defined by portions 15 and 14 accommodating the wheel axle 16 which is snugly welded or soldered to the frame within this angle as indicated at 17. The same welding material which secures the frame to the axle may, if desired, also aid in securing the wheel guards 18, (to be later described) more securely to the frame.

Beyond the forwardly and downwardly turned portions 15, the ends of the rod stock extend forwardly and slightly inwardly as at 19, terminating in upstanding hook portions 20 which incline outwardly toward the wheels 21 of the truck. These truck wheels may be of any suitable type and rotate freely on the ends of the fixed axle 16 being secured against loss by cotter pins 22.

Wheel guards 18 include main side plate portions having suitable openings therein through which the axle 16 passes and which are welded as at 17 to both the axle and the main frame. These main wheel plates extend upwardly above the peripheries of the wheels 21 and then are turned outwardly to provide arcuate wheel protecting flanges 23. Preferably the lower rear edge of each plate 19 is bent upon itself to define a sleeve 24 snugly encircling and embracing the run 14 of the frame. Inwardly and forwardly inclining wings 25 are integral with the plates 18, these wings projecting beyond the peripheries of the wheels and at their lower ends being bent upon themselves to define sleeves 26 embracing the runs 19 of the rod stock which constitutes the frame. As indicated at 27 the guard plates 18 may also be welded to the forwardly and downwardly inclining run 15 of the lengths of rod stock with which the wheel guards are associated.

Slidable vertically on the shank 11 is a unit consisting of a pair of downwardly facing hooks 28, 28 and a transversely extending arcuate rest bar 29 of a curvature adapted to follow generally the curvature of the barrel or can supported on the truck. In the present instance the hooks 28 are integral with each other and are formed by cutting out forwardly projecting wing portions 30 of a channel-shaped member, the back 31 of which lies behind the shank 11 and is provided at its lower end with laterally extending lugs 32 riveted or otherwise secured as at 33 to the rear face of the member 29. Thus the member 29 is disposed on the front face of the shank, member 31 is disposed behind the shank and the wings 30 shaped to form the hooks 28 straddle the shank and present the hooks forwardly of the shank.

It will be seen that when the lower rim of a can is engaged by the lower hooks 20 of the frame and the upper rim or edge of a can is engaged by sliding hooks 20 thereover, the weight which is imposed on the upper hooks 28 will tend to draw these hooks forwardly and this tendency is resisted by member 31 which is backed against the shank 11 so that an extremely strong hook structure is provided.

The purpose of the right angle bend defined by the rungs 13 and 14 of the wire stock is to provide an elbow portion at the rear of the wheels which will engage with the riser of a stair as the truck is pulled rearwardly and guide the wheels up the riser and onto the tread of the stair. The elbow defined by the hooks 20 and the wire runs 19 engages the floor if the truck is tilted slightly forwardly and the device is so balanced that it will stand in erect position with the shank, handle and yoke inclined but slightly forwardly and with the elbows 19—20 resting on the ground.

The manner of use of the truck, that is to say, the engagement of the hooks 20 under the lower rim of a barrel or can, the moving of the can rearwardly against the handle while the hooks 28 are elevated and then dropping the hooks over the upper edge of the can is entirely obvious.

In Figs. 6 to 8 inclusive we have illustrated a simplified type of slide hook construction and eliminated the bar 29 against which a can or barrel is adapted to rest. This hook structure is formed from the blank 36 illustrated in Fig. 8. It includes an intermediate portion 35 to lie against the back of the shank 11, a pair of wing portions 38 which wrap about the shank and a pair of hook portions 37 which may be bent forwardly into parallelism as clearly illustrated in Figs. 6 and 7. Here again it will be observed that any strain applied to the hooks by a forward tilting tendency of the container mounted on the truck, is transmitted through the member 35 directly to the shank 11 so that a very strong arrangement of slide hook is afforded.

It is worthy of note however that contrary to ordinary hand trucks for handling trunks, boxes etc., the present truck may be most conveniently manipulated without tilting it to any great extent out of the vertical plane to the end that open containers of ashes and even liquid may be conveniently handled without danger of spilling the contents from the containers.

The wheel guards serve a three-fold purpose. In the first place they prevent the front edges of the wheels from rubbing against the article being carried, since they extend forwardly of the wheel; in the second place they prevent the article from resting upon the top of the wheels due to the presence of the flanges 23; in the third place they prevent the articles from sliding against the inner faces of the wheels due to the presence of the guard plate 18 and the wing extension 25. The wheel guards, the hook carrying elements 31 and the cross bar 29 comprise extremely simple stampings. The handle, shank, yoke, axle, carrier and lower can receiving hooks are all formed by a simple bending operation upon a length of wire or rod stock of suitable mechanical strength.

There is thus afforded a device devoid of unnecessary parts of simple and light weight construction occupying but a minimum amount of space in storage and capable when loaded, of conveniently trundling or being dragged backward up a flight of stairs.

It will thus be seen that there is herein described apparatus in which the several features of this invention are embodied, and which apparatus in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having thus described our invention, what we claim as new and desire to secure by Letters Patent is:—

A truck including a metal frame cooperatively defining a handle, a shank, a portion to which a wheel axle is to be welded and article engaging means disposed forwardly and in advance of said axle, an axle welded to the frame wheels on the ends of the axle and wheel guards welded to the frame and preventing contact with an article carried by the truck with the wheels, said wheel guards including plates disposed inwardly of the wheels, flanges extending over the tops of the wheels and wing pieces extending forwardly of the wheels, said wheel guard plates including portions bent to encircle and embrace parts of the frame.

GEORGE P. MORSE.
LOUIS LIDSKY.